United States Patent
Fee et al.

(10) Patent No.: US 9,104,484 B2
(45) Date of Patent: Aug. 11, 2015

(54) METHODS AND SYSTEMS FOR EVALUATING BYTECODE IN AN ON-DEMAND SERVICE ENVIRONMENT INCLUDING TRANSLATION OF APEX TO BYTECODE

(75) Inventors: Gregory D. Fee, Seattle, WA (US); William J. Gallagher, Howard, PA (US)

(73) Assignee: salesforce.com, inc., San Francisco, CA (US)

( * ) Notice: Subject to any disclaimer, the term of this patent is extended or adjusted under 35 U.S.C. 154(b) by 67 days.

(21) Appl. No.: 13/091,347

(22) Filed: Apr. 21, 2011

(65) Prior Publication Data

US 2011/0265066 A1    Oct. 27, 2011

Related U.S. Application Data

(60) Provisional application No. 61/326,385, filed on Apr. 21, 2010, provisional application No. 61/326,368, filed on Apr. 21, 2010, provisional application No. 61/326,377, filed on Apr. 21, 2010.

(51) Int. Cl.
| | | |
|---|---|---|
| *G06F 9/44* | (2006.01) | |
| *G06F 17/00* | (2006.01) | |
| *G06F 9/50* | (2006.01) | |
| *G06F 17/30* | (2006.01) | |
| *G06F 12/08* | (2006.01) | |

(52) U.S. Cl.
CPC ........ *G06F 9/5027* (2013.01); *G06F 17/30132* (2013.01); *G06F 12/0866* (2013.01); *G06F 2209/549* (2013.01); *G06F 2212/465* (2013.01)

(58) Field of Classification Search
CPC . G06F 8/443; G06F 9/45504; G06F 9/45508; G06F 9/30174; G06F 8/41

USPC .................................................. 717/126, 178
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

Final Office Action for U.S. Appl. No. 13/091,335, mailed Jan. 30, 2014, 22 pages.

(Continued)

*Primary Examiner* — Don Wong
*Assistant Examiner* — Mohammad Kabir
(74) *Attorney, Agent, or Firm* — Blakely, Sokoloff, Taylor & Zafman

(57) ABSTRACT

Techniques and mechanisms for conversion of code of a first type to bytecode. Apex provides various unique characteristics. When converting to bytecode, these characteristics are handled to provide bytecode functionality. Some of the unique characteristics of Apex include Autoboxing, SOQL, Properties, Comparisons, Modifiers, Code coverage mechanisms and Sharing mechanisms.

10 Claims, 6 Drawing Sheets

(56) References Cited

U.S. PATENT DOCUMENTS

| | | | |
|---|---|---|---|
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,353,818 B1* | 3/2002 | Carino, Jr. | 707/104 |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,477,540 B1* | 11/2002 | Singh et al. | 707/103 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,581,052 B1* | 6/2003 | Slutz | 717/124 |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,714,979 B1 | 3/2004 | Brandt et al. | |
| 6,718,540 B1 | 4/2004 | Azua et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,084 B1* | 5/2004 | Kabra et al. | 707/2 |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,403,941 B2* | 7/2008 | Bedworth et al. | 707/102 |
| 7,620,655 B2 | 11/2009 | Larsson et al. | |
| 7,627,594 B2* | 12/2009 | Meijer et al. | 707/101 |
| 8,244,714 B1 | 8/2012 | Collins et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0081192 A1* | 4/2005 | DeLine et al. | 717/126 |
| 2005/0091098 A1 | 4/2005 | Brodersen et al. | |
| 2008/0082572 A1* | 4/2008 | Ballard et al. | 707/102 |
| 2008/0086479 A1* | 4/2008 | Fry et al. | 707/10 |
| 2009/0030906 A1* | 1/2009 | Doshi et al. | 707/101 |
| 2009/0049101 A1 | 2/2009 | Weissman | |
| 2009/0049422 A1* | 2/2009 | Hage et al. | 717/104 |
| 2009/0055571 A1 | 2/2009 | Budko et al. | |
| 2009/0276771 A1 | 11/2009 | Nickolov et al. | |
| 2010/0030745 A1 | 2/2010 | Adler | |
| 2010/0042585 A1 | 2/2010 | Adler | |
| 2010/0070516 A1 | 3/2010 | Adler | |
| 2010/0095284 A1* | 4/2010 | Herring et al. | 717/148 |
| 2011/0119290 A1* | 5/2011 | Dhoble | 707/769 |
| 2011/0264650 A1 | 10/2011 | Tobin et al. | |
| 2011/0264681 A1 | 10/2011 | Kimberlin et al. | |
| 2011/0264704 A1 | 10/2011 | Mehra | |
| 2011/0282872 A1 | 11/2011 | Oksman et al. | |

OTHER PUBLICATIONS

Non-Final Office Action for U.S. Appl. No. 13/091,335, mailed Jan. 4, 2013, 22 pages.
Non-Final Office Action for U.S. Appl. No. 13/091,335, mailed Aug. 12, 2013, 23 pages.
Non-Final Office Action for U.S. Appl. No. 13/091,353, mailed Jan. 17, 2014, 29 pages.
Non-Final Office Action for U.S. Appl. No. 13/091,353, mailed Jul. 19, 2012, 24 pages.
Final Office Action for U.S. Appl. No. 13/091,353, mailed Apr. 25, 2013, 30 pages.
Ex Parte Quayle Action for U.S. Appl. No. 13/091,353, mailed Aug. 7, 2014, 9 pages.
Non-Final Office Action for U.S. Appl. No. 13/091,335, mailed Sep. 5, 2014, 31 pages.
Notice of Allowance for U.S. Appl. No. 13/091,353, mailed Oct. 30, 2014, 5 pages.

* cited by examiner

METHODS AND SYSTEMS FOR EVALUATING BYTECODE IN AN ON-DEMAND SERVICE ENVIRONMENT INCLUDING TRANSLATION OF APEX TO BYTECODE

CLAIM OF PRIORITY

This application claims the benefit of U.S. Provisional Patent Application 61/326,368 entitled METHODS AND SYSTEMS FOR EVALUATING BYTECODE IN AN ON-DEMAND SERVICE ENVIRONMENT INCLUDING EFFICIENT UTILIZATION OF SHARED RESOURCES AND GOVERNOR LIMIT ENFORCEMENT, by Gregory D. Fee and William J. Gallagher, filed Apr. 21, 2010, the entire contents of which are incorporated herein by reference.

This application claims the benefit of U.S. Provisional Patent Application 61/326,377 entitled METHODS AND SYSTEMS FOR EVALUATING BYTECODE IN AN ON-DEMAND SERVICE ENVIRONMENT INCLUDING TRANSLATION OF APEX TO BYTECODE, by Gregory D. Fee and William J. Gallagher, filed Apr. 21, 2010, the entire contents of which are incorporated herein by reference.

This application claims the benefit of U.S. Provisional Patent Application 61/326,385 entitled METHODS AND SYSTEMS FOR EVALUATING BYTECODE IN AN ON-DEMAND SERVICE ENVIRONMENT INCLUDING PROVIDING A MULTI-TENANT, MULTI-LANGUAGE RUNTIME ENVIRONMENTS AND SYSTEMS, by Gregory D. Fee and William J. Gallagher, filed Apr. 21, 2010, the entire contents of which are incorporated herein by reference.

CROSS REFERENCE TO RELATED APPLICATIONS

The following commonly owned, co-pending United States Patents and Patent Applications, including the present application, are related to each other. Each of the other patents/applications are incorporated by reference herein in its entirety:

U.S. patent application Ser. No. 13/091,353, by Gregory D. Fee and William J. Gallagher, filed Apr. 21, 2011; and U.S. patent application Ser. No. 13/091,135, by Gregory D. Fee and William J. Gallagher, filed Apr. 21, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments described herein relate generally to evaluation of bytecode in a database network system. More particularly, embodiments described herein relate to efficient utilization of shared resources for evaluation of bytecode.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

As an on demand platform, Apex™ provides a set of features for building business applications including, for example, data models and objects to manage data, a workflow engine for managing collaboration of that data, a user interface model to handle forms and other interactions, and a Web services application programming interface (API) for programmatic access and integration. These platform technologies support custom applications and integrations, and allow developers to build applications utilizing this on demand model.

Apex code is "on demand," running without requiring local servers or software. Apex code may run in a multi-tenant environment, providing the economic and manageability benefits of a shared service while keeping the definition, data and behavior of each customer's application separate from each other. For developers, the combination of these capabilities with this on-demand, multi-tenant delivery provides convenience, scalability, and safety of an on-demand database, combined with the flexibility and control of a procedural language.

Apex code provides a powerful and productive approach to creating functionality and logic, allowing developers to focus on elements specific to their application, while leaving other elements to the platform's framework. Apex code is a successful and innovative language in part because of its multi-tenant design. Multitenancy allows Apex to scale to a large number of customers with a relatively modest hardware investment. Apex code is abstracted and governed, utilizing only as many resources as is allowed.

Performance is a key requirement for any programming language. It is especially important in a multitenant environment where processor cycles spent interpreting code for a given customer have a direct and negative impact on other customers sharing the same environment. Thus, improving performance not only results in quicker response times for users but also less impact on other tenants in terms of the overall load on the system.

All languages tend to have some start-up cost associated with getting code into a state where it can be executed. This cost includes, for example, the processing required to load the executable form of the code and to link it with dependent code. Unlike most programming languages, however, start-up costs tend to dominate in a multi-tenant language where the interpreter may be called upon to execute code from any one of possibly thousands of tenants. The ability to cache executable code to avoid the start-up costs on subsequent requests is limited by the large working set. In addition, the requests tend to be relatively short, making the start-up cost a larger proportion of the overall request time.

BRIEF DESCRIPTION OF THE DRAWINGS

In the following drawings like reference numbers are used to refer to like elements. Although the following figures depict various examples, the invention is not limited to the examples depicted in the figures.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

As used herein, the term bytecode refers to various forms of instruction sets to be executed by a software interpreter. Bytecode instructions are also suitable for further compilation into machine code. Bytecode instructions are processed by software, but have similarities to hardware instructions. Virtual stack machines are common execution environments. A bytecode program may be executed by parsing instructions and directly executing the instructions, one at a time. Some systems, called dynamic translators, or "just-in-time" (JIT) compilers, translate bytecode into machine language as necessary at runtime.

Figure 1:
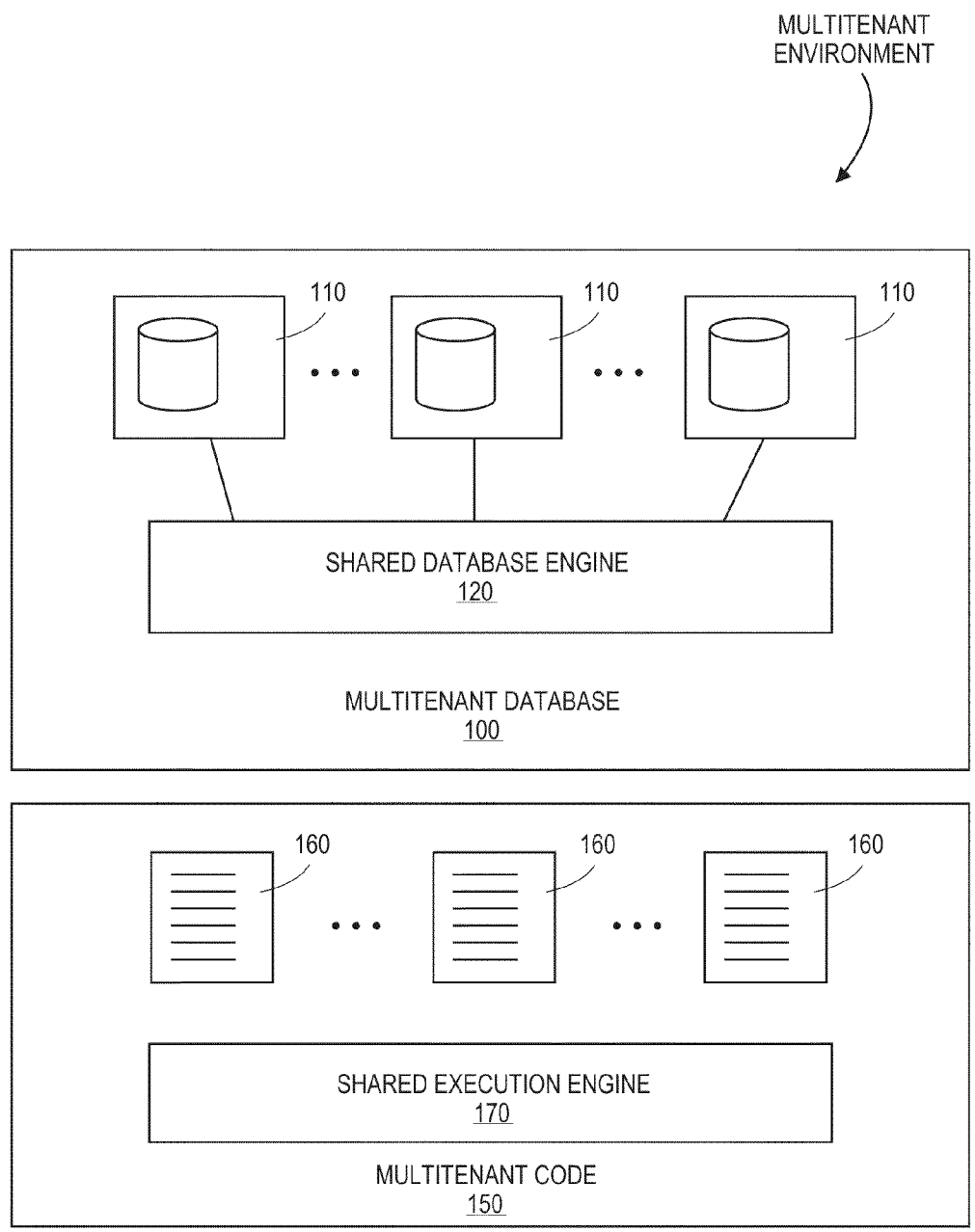
FIG. 1 is a block diagram of one embodiment of a multi-tenant environment.

FIG. 1 is a block diagram of one embodiment of a multi-tenant environment. The multitenant environment includes multitenant database 100, which includes multiple tenant data sets 110 corresponding to the tenants of the multitenant environment. In one embodiment, each tenant has a unique tenant ID that is utilized to control access to the multitenant environment. In one embodiment, multitenant database 100 stores data for multiple client entities each identified by a tenant ID having one of one or more users associated with the tenant ID.

The users of each of the multiple client entities can only access data identified by a tenant ID associated with the respective client entity. In one embodiment, multitenant database 100 is a hosted database provided by an entity separate from the client entities, and provides on-demand database service to the client entities. Multitenant database 100 further includes shared database engine 120 that provides the functionality of multitenant database 100 in operating on tenant data sets 110.

The multitenant environment further includes multitenant code 150, which includes multiple tenant logic sets 160 corresponding to the tenants of the multitenant environment. In one embodiment, multitenant code 150 includes code for multiple client entities each identified by the corresponding tenant IDs. The users of each of the multiple client entities can only access code identified by the tenant ID associated with the respective client entity. In one embodiment, multitenant code 150 is stored in a hosted database provided by an entity separate from the client entities, and provides on-demand database service to the client entities. Multitenant code 150 further includes shared execution engine 170 that provides the ability to execute code represented by multitenant code 150. In one embodiment, shared execution engine 170 is a virtual machine.

Apex is a successful and innovative language in part because of its multi-tenant design. Multi-tenancy allows Apex to scale to a large number of customers with a relatively modest hardware investment.

Performance is a key requirement for any programming language. It is especially important in a multi-tenant environment where processor cycles spent interpreting code for a given customer have a direct and negative impact on other customers sharing the same environment. Thus, improving performance not only results in quicker response times for users but also less impact on other tenants in terms of the overall load on the system.

All languages tend to have some start-up cost associated with getting code into a state where it can be executed. This cost includes the processing required to load the executable form of the code and to link it with dependent code. Unlike most programming languages, however, start-up costs tend to dominate in a multi-tenant language where the interpreter may be called upon to execute code from any one of literally thousands of tenants. The ability to cache executable code to avoid the start-up costs on subsequent requests is limited by the large working set. In addition, the requests tend to be relatively short, making the start-up cost a larger proportion of the overall request time.

Apex is currently implemented as an Abstract Syntax Tree (AST)-based interpreter. Most compilers parse source code into an intermediate AST form. An AST interpreter actually executes directly on the generated AST in order to interpret the code.

A full source code parse is required to compute the AST. Parsing the Apex source code is expensive. To minimize this cost, the Apex runtime caches the generated AST in memcached. The term "memcached" refers to a general-purpose distributed memory caching system often used to speed up dynamic database-driven applications or websites by caching data and objects in system memory to reduce the number of times an external data source (such as a database or API) must be read. Memcached runs on Unix, Windows and MacOS.

Storage of the AST in memcached requires the AST to be serialized into a byte stream. The AST is comprised of a set of nodes, each representing some construct in the source code (such as a while loop, an add expression, etc.). It tends to be fairly large: for example, it can be approximately 10.5 times the source code size in terms of heap consumption. In addition, this size consists of a very large number of very small Java objects. Unfortunately, very large object graphs are expensive to serialize using Java serialization. Deserializing the AST from memcached is the dominant cost in many Apex requests.

The Apex interpreter serves as a level of isolation between customer code and the host VM. It enforces governor limits and brokers requests to the underlying platform on behalf of customer code. In one embodiment, the interpreter is not a full-fledged Java virtual machine instead delegating to the real Java virtual machine (JVM) for various services. Garbage collection is an example of this. The interpreter is also able to delegate to the real JVM on a per type basis.

In one embodiment, Apex code is converted to bytecode that may be executed by a virtual machine. In one embodiment, the Apex code may be converted to an intermediate representation before being converted to bytecode. In another embodiment, the Apex code may be converted directly to bytecode.

In one embodiment, Apex provides various unique characteristics. When converting to bytecode, these characteristics are handled as described below to provide bytecode functionality. Some of the unique characteristics of Apex include Autoboxing, SOQL, Properties, Comparisons, Modifiers, Code coverage mechanisms and Sharing mechanisms.

Figure 2:
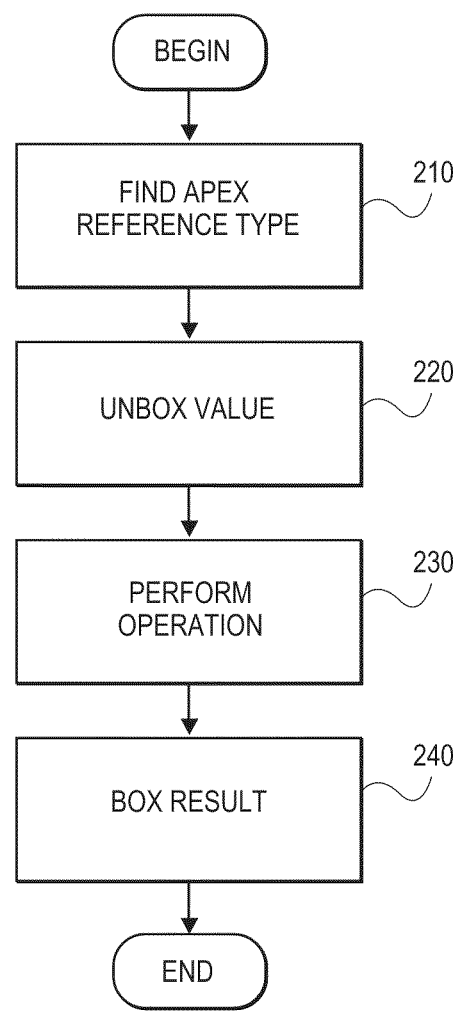
FIG. 2 is a flow diagram of one embodiment of a technique for handling Apex reference types.

FIG. 2 is a flow diagram of one embodiment of a technique for handling Apex reference types. All values in Apex are reference types. This means that for value types (e.g., integer, double, decimal), 210, that the value must be unboxed, 220, the operation performed, 230, and then the result is boxed, 240. An example of this:

```
Apex:
int c = 2 * a + b;
Bytecode:
iconst_2
box
unbox
load a
unbox
imul
box
unbox
load b
unbox
iadd
box
```

In one embodiment, a boxing optimization identifies situations where the intermediate value is not used and eliminates the extra boxing and unboxing instructions. The resulting bytecode may be:

```
iconst_2
load a
unbox
imul
load b
unbox
iadd
box
```

Figure 3:
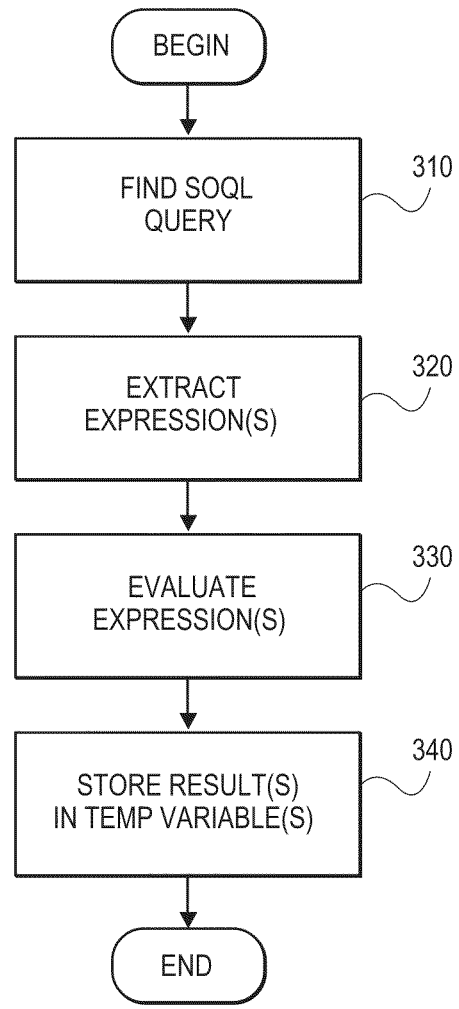
FIG. 3 is a flow diagram of one embodiment of a technique for handling inline SOQL queries.

FIG. 3 is a flow diagram of one embodiment of a technique for handling inline SOQL queries. Apex includes an inline, compile-time type checked version of Salesforce Object Query Language (SOQL). An example of this type of SOQL query, 310, is:

```
List<SObject>result=[select id, name from Account];
```

In bytecode, this is type checked in the compiler and then emitted as a method invocation with a stringized form of the query:

```
ldc "select id, name from Account"
invokestatic Database.query(String)
```

In cases where the SOQL query includes expressions, the expressions are pulled out, 320, evaluated, 330, and the results stored in temporary variables. The SOQL query is then rewritten to refer to the temporary variables, 340.

```
List<SObject> result = [select id, name from Account where name =
:('foo' + 'bar')];
```

Becomes

```
String temp1 = 'foo' + 'bar';
List<SObject> result = [select id, name from Account where name =
:temp1];
```

Figure 4:
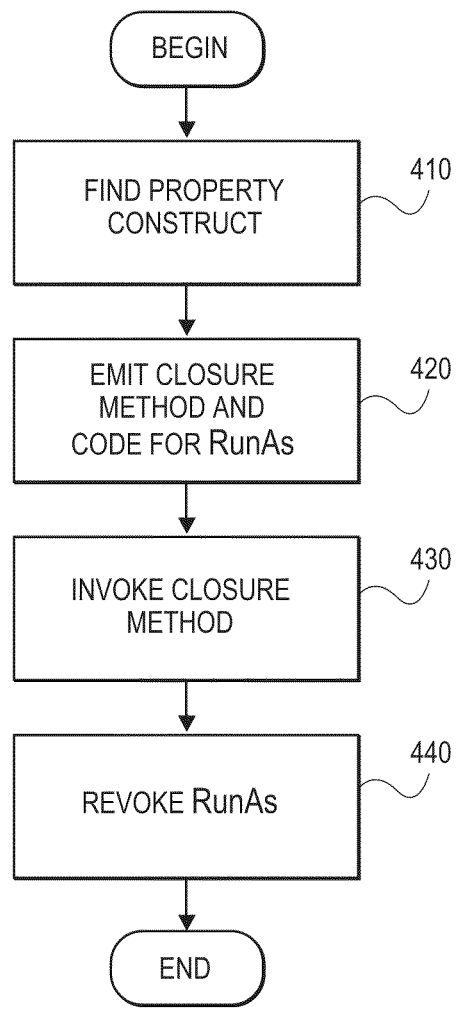
FIG. 4 is a flow diagram of one embodiment of a technique for handling Apex properties.

FIG. 4 is a flow diagram of one embodiment of a technique for handling Apex properties. Bytecode includes no direct support for properties. Apex emits several constructs for each property: (1) A field of the same type as the property on the type that defines the property; (2) A setter method named _sfdc_[Name of the property] that includes the user defined code or default code to set the field; and (3) A getter method name _sfdc_[Name of the property] that includes the user defined code or default code to get the field.

In addition, Apex tracks a tuple for each property [modifiers, line, name] in a Java list, 410. This list (as well as potentially other metadata about the type) is binary serialized and included as the constant value for a static, private, final field defined on the enclosing type.

The runAs construct in Apex uses a closure-style syntax.

```
{
    runAs(user) {
        // some user code
    }
}
```

One mechanism to translate this to bytecode include emitting a closure method plus code to set the runAs, 420, invoke the closure method, 430, and then revoke the runAs, 440. Another mechanism to translate this to bytecode is to emit the code inline in the method using a try/finally construct.

```
{
    try {
        switchToUser(user);
        // some user code
    }
    finally {
        switchBackToOriginalUser( );
    }
}
```

Apex includes type and method modifiers that appear in bytecode, such as public and static, as well as many that do not, including global and testmethod. In the cases where Apex needs to emit a modifier that appears in bytecode, the compiler uses the bytecode version. For the modifiers unique to Apex, an annotation is emitted on the type or method. This annotation has a boolean field for each Apex specific modifier that defaults to false. The annotation that is emitted will include field sets explicitly set the fields that match the modifiers to true.

The Apex code coverage mechanism uses the bytecode line number table to identify user code that requires coverage. Additionally, Apex includes some constructs where line number table information is emitted so that debugging information is correct but where code coverage should be skipped. Examples of this include invocations of the System.debug (String) method and testmethods. When a type has code that includes these constructs, Apex emits a private, static, final field of type java.lang.String into the bytecode with value that is a comma-delimited string of the suppressed line numbers.

For methods on types where the 'with sharing' or 'without sharing' type modifier is used, Apex emits methods to set and remove the appropriate sharing mode using a try/finally construct. For example:

```
class with sharing Foo {
    public static void bar( ) {
        // some user code
    }
}
``` looks like:

```
class Foo {
    public static void bar( ) {
        try {
            startWithSharingMode( );
            // some user code
        }
        finally {
            endWithSharingMode( );
        }
    }
}
```

The interpreter uses an abstract representation of a type. The representation is captured in an interface, InterpretableClass, that allows the interpreter to operate over multiple type representations without knowledge of the underlying implementation. This allows the interpreter to implement a relatively small set of generic functionality (e.g. type loading, method lookups) and pushes the details of how types load metadata and execute to concrete classes specific to that task. Further is allows separation of how different type representations interact with the interpreter enabling a type representation extensibility model.

In one embodiment, there are three "standard" implementations of InterpretableClass:

```
ByteCodeInterpretableClass,
JavaBackedInterpretableClass, and
ReflectionInterpretableClass.
```

ByteCodeInterpretableClass loads a bytecode class file into memory and understands how to interpret the bytecode instructions in method bodies. All other type representations are effectively special cases designed to fullfil a particular need.

The JavaBackedInterpretableClass allows method bodies of a type representation to easily interact with the interpreter. This allows the method implementations to use interpreter services directly, such as loading a type explicitly. This representation is currently used for java.lang.Object and java.lang.Class.

The ReflectionInterpretableClass acts as a proxy that exposes types loaded in the real JVM to the interpreter. This allows interoperation between types loaded in the interpreter and the real JVM. The type manages execution of methods by marshaling arguments into the real JVM, executing the method via reflection, and the marshaling the return value, if any, back into the interpreter.

One application of this type representation is as an escape mechanism for performance critical code allowing it to run directly in the JVM. A possible longer term application is as the primary means of interoperation between the interpreter and a host environment (such as the SFDC service). A limitation of this type representation currently is that it is unable to be a super class in a type hierarchy in the interpreter.

The interpreter also uses an abstract representation of object instances. This representation is captured in an interface, ObjectInstance (below), that allows the interpreter to operate over multiple object instance representations without knowledge of the underlying implementation. This allows the interpreter to implement a relatively small set of generic functionality (e.g. heap walking, virtual method lookups) and pushes the details of how types load metadata and execute to concrete classes specific to that task. Further, in combination with the InterpretableClass interface, this allows separation of how different type representations interact with the interpreter enabling a type representation extensibility model.

There is a concrete implementation of ObjectInstance that corresponds to each implementation of InterpretableClass. For instance, ByteCodeInterpretableClass has a corresponding ByteCodeObjectInstance.

In one embodiment, the interpreter, via the ByteCodeInterpretableClass, implements the full set of bytecode instructions from, for example, Java 1.6. Instruction issuance is performed using a switch statement that has a case for all possible bytecode instructions. A simple loop drives the execution of a code block and individual instructions are able to terminate the loop as necessary (eg when the method returns).

The implementations of the instructions use the ObjectInstance and InterpretableClass interfaces allowing bytecode to manipulate any type loaded into the system transparently. The runtime call stack similarly takes advantage of the ObjectInstance/InterpretableClass abstraction to allow seamless method invocation into and out of bytecode. A small set of directives allows a method implementation to inform the stack of the manner in which it completed.

None—no stack action is necessary. This is the typical response if a method is yielding control to a method that it is invoking Pop—pop the current frame from the stack. This is the typical response when a void method returns.

PopHasReturn—pop the current frame from the stack and push its return value into the local stack of the calling method. This is the typical response when a non-void method returns.

ExceptionThrown—the current method raised an exception. The system searches for appropriate filters to handle the exception and delivers control to the filter handlers appropriately.

Tailcall—replace the current method frame with a new method frame that has already been pushed on the stack.

One motivation in moving the Apex runtime to bytecode interpretations is performance. The broader explanation of these performance considerations below. In more local optimizations, bytecode interpretation has two optimizations.

The first optimization is to use stack windows instead of parameter passing for method invocation. This technique takes advantage of the Java interpretation semantic that passes the top "n" stack variables in the caller to become local variables in the callee's context. The stack window technique stores stack and local variables for multiple methods in a shared data structure. When a method invokes another, a window into the shared data structure is passed to the callee. This technique allows a long lived data structure, the shared stack and local variables, to hold most of the method invocation data which reduces the amount of memory garbage created and also increases the locality of data to better utilize processor caches.

The second optimization uses a struct to store stack and local variable data. This struct has a 32-bit integer field and an object reference. The integer field holds data for all primitive types while the object field holds all reference types. This struct allows a single logical stack or local variable slot to hold all data types with a minimum of conversion required. Note that the 64-bit primitives, double and long, still span two variables slots as is required by the Java standard and require manipulation to reform during interpretation.

Apex supports two ways to execute a SOQL query: statically and dynamically. A static SOQL query is specified by inlining the query within the surrounding apex code. The inline query supports binding arbitrary expressions to variables defined in the query. For example:

Account a=[select id, name from Account where
        name=:name];

Integrating the bytecode into the service is to make bytecode generation and interpretation a plugin replacement for the current tree-based model based on an organization permission. There are two advantages to this approach. First, it allows the move to the bytecode based runtime to be transparent to the rest of the service. This is necessary as there are thousands of call sites within the service that reference the Apex runtime in some manner. Second, it allows us to pilot the bytecode runtime and gradually increase the number of organizations using it as we get more data on the stability, performance, and correctness characteristics of the implementation compared to the tree-based runtime.

In one embodiment, wall APIs provide the abstraction that allows transparently switching between the tree-based and bytecode runtimes. Most of the wall is based on a set of interfaces. We create a parallel implementation of concrete classes implementing these interfaces that wrap the bytecode runtime. A new top level wall construct, ApexEngine, encapsulates the logic to select the appropriate apex implementation for this organization and returns an ApexContext implementation that acts as a factory for all subsequent wall calls in the request without the need to reevaluate the permission.

Note that the objects returned by wall APIs are request specific. This means that caching objects returned by the wall across request boundaries is unsupported. In particular, if the organization permission controlling which runtime is used is changed between requests then errors can occur. For example, caching an ApexObjectType that represents Integer (or an entire method signature) in a static fields and then using it to perform comparisons against types found in method signatures will give incorrect results. Instead, the type or signature is loaded on a per request basis and then a comparison is performed.

In one embodiment, the integration of bytecode into the SFDC service uses the three standard type representations. User code as well as file based Apex is represented using the ByteCodeInterpretableClass. For Java runtime classes, some types are represented with ByteCodeInterpretableClass and some using ReflectionInterpretableClass. In one embodiment, Java runtime types are loaded as ReflectionInterpretableClass. In alternate embodiments, a whitelist may be created of types that are allowable for load with ReflectionInterpretableClass and all other types will be loaded using ByteCodeInterpretableClass. JavaBackedInterpretableClass is not explicitly used, but is the basis for the java.lang.Object and java.lang.Class types used during Apex execution.

Additionally, the SFDC service integration utilizes two additional type representations. SObjectInterpretableClass is a projection of SObject entities into the interpreter. It exposes Entity fields as fields on the class as well as the instance methods callable from Apex on SObjects. WrapperInterpretableClass projects Apex wrapper types (common.apex.runtime.impl.WrapperType) into the interpreter. This is a mapping of static and instance wrapper methods as class methods. WrapperTypes do not support fields. As the implementation of SObjects and WrapperTypes in the interpreter are not native, we are required to marshal values from the interpreter to a form that these types understand. This requires SFDC specific extensions to the marshaler.

Apex collections may be represented as wrapper types. Although very similar to Java's collections, there are differences that the existing Apex collections may be exposed as WrapperInterpretableClass. One difference is that some methods have different signatures between Java and Apex (e.g. Java's List.remove returns a boolean, Apex's List.remove returns an element type).

Another difference is that Apex enforces different casting semantics that Java. For instance, an object of type List<Account> in Apex would fail when you attempted to cast List<Contact> with a class cast exception. In Java, that cast would succeed until you attempted an operation on the casted list (or sometimes beyond).

Finally, Apex uses the same type to represent readonly and writable objects whereas Java achieves a similar semantic using an interface and two implementations. In the long-term we would like to shift the generated Apex bytecode to use Java collections directly given the major commonality.

In one embodiment, the primary storage location for generated bytecode is FileForce. The bytecode will be stored in an Udd FFX_BLOB column on the core.apex_class and core.apex_trigger tables. We will define a new organization permission in order to allow the storage location to be configurable between FileForce and the DB on an organization granularity basis. In one embodiment, we will also define a minimum data size of 32 k before pushing the data from the db to FFX.

At runtime, the bytecode will be loaded through the distributed cache as part of the ApexClassInfo which is currently used to load the Apex source code.

In one embodiment, Apex utilizes serialization in two distinct ways in the tree-based implementation. One way is to cache type definitions in the form of the AST generated by the parser for use in subsequent executions. The other is to serialize object graphs for use in subsequent requests, such as state in scheduled apex, batch apex, or VisualForce controllers. Bytecode affects both of these uses.

The bytecode implementation no longer needs to serialize type definitions. This is replaced by storing the bytecode representation, which is a binary format, of the type definition. In one embodiment, the bytecode generated by the Apex compiler is standard Java® bytecode. As such, we expect few problems related to versioning the bytecode from release to release. We do, however, expect to want to change the bytecode representation of various Apex constructs such as those described above as the Apex language evolves. In most cases, we expect the existing bytecode to continue to work. When we do require a breaking change, we will update the version number for class files generated by the compiler and loaded by the interpreter. The interpreter will consider any classes it finds with a different version number stale and regenerate the class file from source.

The bytecode implementation also allows serialization of object instances. This is functionally equivalent to the object instance serialization in the tree-based implementation. Tree-based object instances can not be deserialized into an organization that is set to use bytecode. Because we will not flip this permission very often (hopefully just once) per organization that we can identify times when there is no serialized state that will be broken or alternatively that the organization is aware that it needs to regenerate the serialized state.

The major motivation to move to bytecode is performance. The major concern for Apex is how we handle a comparatively large code base of user code (+140M lines) within a service where Apex execution is relatively sparse (~1% of overall CPU use). We decided the focus should be on loading, executing, and unloading Apex code as quickly as possible while minimizing the resources required. The bytecode implementation is tuned in several ways to support these goals.

The choice of bytecode itself aids in this goal. The compilation of the Apex code required to execute an request can often be a significant percentage of the overall request time. As such, Apex employs a two-level cache (memory->memcached) to store compiled type definitions. The tree-based implementation uses serialized ASTs in this cache which is the source of three issues.

First, since the AST is an arbitrary and sometimes deep tree, Java® serialization causes a stack overflow during the serialization into or deserialization out of the cache. This causes the system to recompile the class from source, incurring that expense on every request.

Second, the serialized AST is quite large compared to the original source (on average ~10× the size) which limits the amount of cached type definitions we can keep in local memory and increases the time required to download from memcached.

Third, Java® deserialization is slow and does not support progressive deserialization so the entire type definition is deserialized even if we only need to execute one method. In contrast, the bytecode implementation can create a binary form for all Apex defined types (the bytecode itself) which is relatively concise (typically close to the size of the input source). In one embodiment, we use BCEL to parse class files which allows progressive parsing of the class file.

In one embodiment, the bytecode implementation performs lazy linking The interpreter attempts to delay loading and parsing of type information as late as is allowed within the java specification requirements. This is similar to and a continuation of the lazy linking semantics in the current tree-based implementation. This allows the minimum amount of code to be loaded and parsed to execute an Apex request. Additionally, the interpreter does not cache references to types internally allowing quick conversion of type information to garbage when a request completes.

In one embodiment, the interpreter implementation throws a two new exception types. InterpreterRuntimeException signifies a fatal error in the interpreter itself. InterpreterExecutionException signifies a user exception during bytecode execution. These two types are handled by the wall implementation for bytecode so consumers need not deal with them directly.

Figure 5:
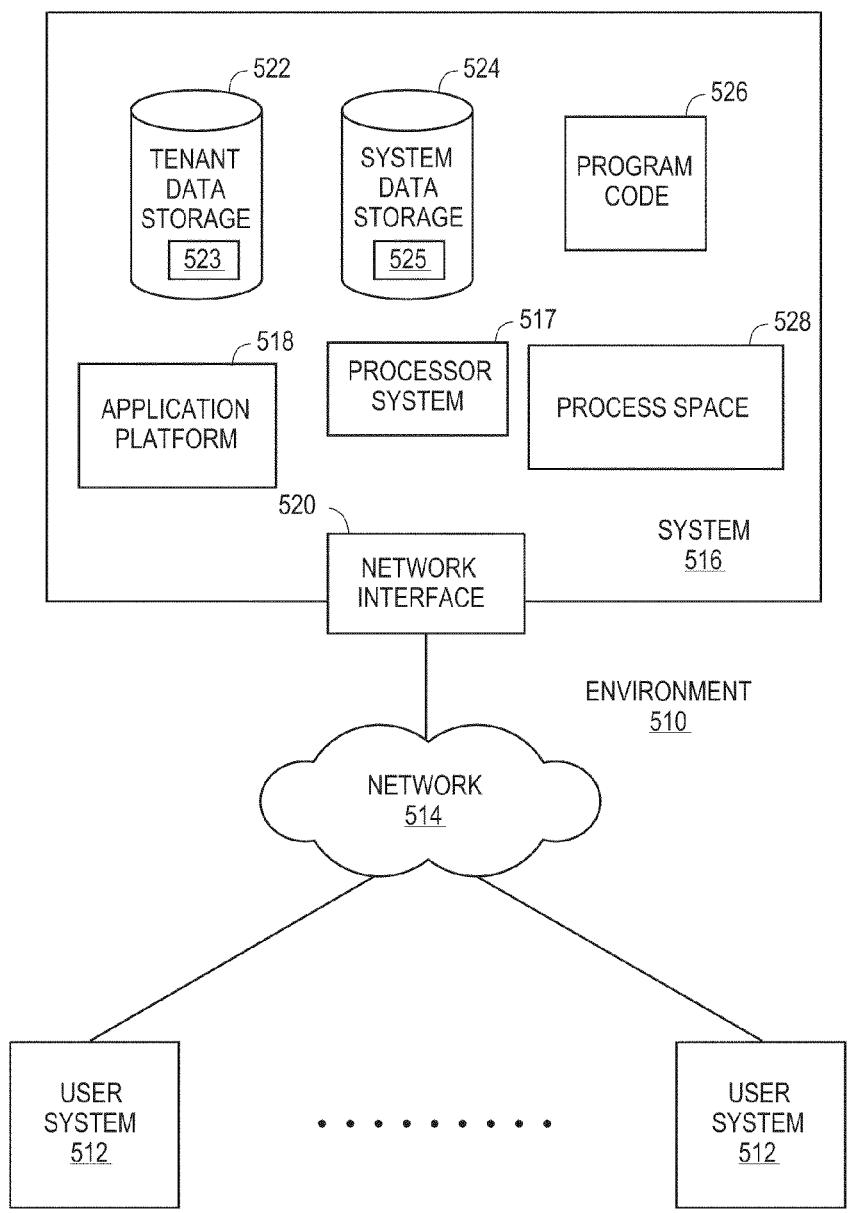
FIG. 5 is a block diagram of an environment where an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein.

A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content.

With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514.

Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments described herein can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS). It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
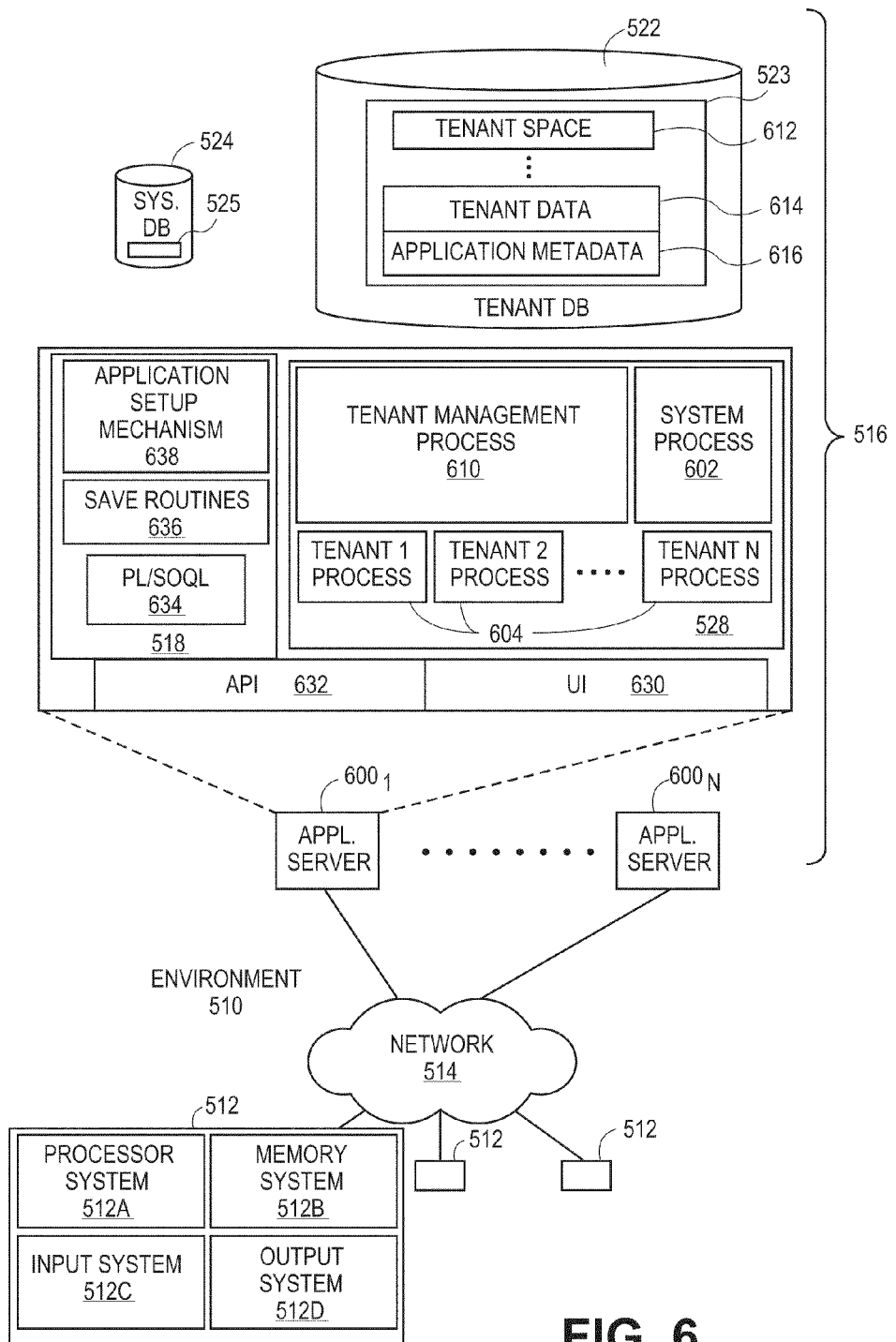
FIG. 6 is a block diagram of an environment where an on-demand database service might be used.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks.

As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multitenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:

executing, with one or more processors, code conforming to a first programming language in a multitenant environment, the code conforming to the first programming language having a plurality of reference types, wherein the multitenant environment includes data for multiple client entities, each identified by a tenant identifier (ID) having one of one or more users associated with the tenant ID, users of each of multiple client identities can only access data identified by a tenant ID associated with the respective client entity, and the multitenant environment is at least a hosted database provided by an entity separate from the client entities, and provides on-demand database service to the client entities wherein the code conforming to the first programming language comprises on demand platform code capable of running without client-side servers or software;

identifying a value type reference from the plurality of reference types;

unboxing the value type;

performing an operation associated with the value type to generate a result;

boxing the result;

generating code conforming to a second programming language comprising at least the boxed result, wherein the code conforming to the second programming language comprises bytecode; and executing the bytecode within the multitenant environment to provide functionality corresponding to the code conforming to the first programming language.

2. The method of claim 1 wherein the value type comprises one of: integer, double integer, decimal.

3. The method of claim 1 further comprising:

identifying intermediate values; and eliminating boxing and unboxing for the intermediate values.

4. A method comprising:
receiving, with one or more processors, code conforming to a first programming language having one or more properties in a multitenant environment, wherein the multitenant environment includes data for multiple client entities, each identified by a tenant identifier (ID) having one of one or more users associated with the tenant ID, users of each of multiple client identities can only access data identified by a tenant ID associated with the respective client entity, and the multitenant environment is at least a hosted database provided by an entity separate from the client entities, and provides on-demand database service to the client entities wherein the code conforming to the first programming language comprises on demand platform code capable of running without client-side servers or software;
generating a plurality of constructs for each property;
tracking each property with a tuple;
generating a closure method with the property;
invoking the closure method;
revoking the closure method;
generating a method construct in a code conforming to a second programming language corresponding to the closure method, wherein the code conforming to the second programming language comprises bytecode; and
executing the bytecode within the multitenant environment to provide functionality corresponding to the code conforming to the first programming language.

5. The method of claim 4 wherein the plurality of constructs comprise:
a field of a same type as the property on a type that defines the property;
a setter method that includes code to set the field; and
a getter method to get the field.

6. An article comprising a non-transitory computer-readable medium having stored thereon instructions that, when executed, cause one or more processors in a multitenant environment to:
execute, with one or more processors, code conforming to a first programming language, the code having a plurality of reference types, wherein the multitenant environment includes data for multiple client entities, each identified by a tenant identifier (ID) having one of one or more users associated with the tenant ID, users of each of multiple client identities can only access data identified by a tenant ID associated with the respective client entity, and the multitenant environment is at least a hosted database provided by an entity separate from the client entities, and provides on-demand database service to the client entities wherein the code conforming to the first programming language comprises on demand platform code capable of running without client-side servers or software;
identify a value type reference from the plurality of reference types;
unbox the value type;
perform an operation associated with the value type to generate a result;
box the result; and
generate code conforming to a second programming language comprising at least the boxed result, wherein the code conforming to the second programming language comprises bytecode; and
execute the bytecode within the multitenant environment to provide functionality corresponding to the code conforming to the first programming language.

7. The article of claim 6 wherein the value type comprises one of: integer, double integer, decimal.

8. The article of claim 6 further comprising instructions that, when executed, cause the one or more processors to:
identify intermediate values; and
eliminate boxing and unboxing for the intermediate values.

9. An article comprising a non-transitory computer-readable medium having stored thereon instructions that, when executed, cause one or more processors in a multitenant environment to:
receiving code conforming to a first programming language having one or more properties, wherein the multitenant environment includes data for multiple client entities, each identified by a tenant identifier (ID) having one of one or more users associated with the tenant ID, users of each of multiple client identities can only access data identified by a tenant ID associated with the respective client entity, and the multitenant environment is at least a hosted database provided by an entity separate from the client entities, and provides on-demand database service to the client entities wherein the code conforming to the first programming language comprises on demand platform code capable of running without client-side servers or software;
generating a plurality of constructs for each property;
tracking each property with a tuple;
generating a closure method with the property;
invoking the closure method;
revoking the closure method;
generating a method construct in a code conforming to a second programming language corresponding to the closure method, wherein the code conforming to the second programming language comprises bytecode; and
executing the bytecode within the multitenant environment to provide functionality corresponding to the code conforming to the first programming language.

10. The article of claim 9 wherein the plurality of constructs comprise:
a field of a same type as the property on a type that defines the property;
a setter method that includes code to set the field; and
a getter method to get the field.

* * * * *